US012563549B2

(12) United States Patent
Gapeyenko et al.

(10) Patent No.: US 12,563,549 B2
(45) Date of Patent: Feb. 24, 2026

(54) CONFIGURED GRANT ENHANCEMENTS

(71) Applicant: NOKIA TECHNOLOGIES OY, Espoo (FI)

(72) Inventors: Margarita Gapeyenko, Espoo (FI); Zexian Li, Espoo (FI); Stefano Paris, Vanves (FR); Chunli Wu, Beijing (CN); Jorma Johannes Kaikkonen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/927,079

(22) Filed: Oct. 25, 2024

(65) Prior Publication Data

US 2025/0056530 A1      Feb. 13, 2025

Related U.S. Application Data

(63) Continuation of application No. PCT/CN2023/077746, filed on Feb. 22, 2023.

(51) Int. Cl.
H04W 72/21          (2023.01)
H04W 72/1263        (2023.01)
H04W 72/0446          (2023.01)

(52) U.S. Cl.
CPC ....... H04W 72/1263 (2013.01); H04W 72/21 (2023.01); H04W 72/0446 (2013.01)

(58) Field of Classification Search
CPC . H04W 72/02; H04W 72/04; H04W 72/0446; H04W 72/121; H04W 72/23;

(Continued)

(56) References Cited

U.S. PATENT DOCUMENTS

| | | |
|---|---|---|
| 2020/0260478 A1 | 8/2020 | Yang et al. |
| 2022/0217736 A1 | 7/2022 | Taherzadeh Boroujeni et al. |
| 2024/0276305 A1 * | 8/2024 | Khoshkholgh Dashtaki .............. H04L 1/1664 |

FOREIGN PATENT DOCUMENTS

| | | | |
|---|---|---|---|
| WO | 2021/009926 A1 | 1/2021 | |
| WO | WO-2024165436 A1 * | 8/2024 | ........ H04W 72/1268 |

OTHER PUBLICATIONS

International Search Report and Written Opinion dated Oct. 25, 2023 corresponding to International Patent Application No. PCT/CN2023/077746.

(Continued)

*Primary Examiner* — Bo Hui A Zhu

(74) *Attorney, Agent, or Firm* — SQUIRE PATTON BOGGS (US) LLP

(57)          ABSTRACT

Example embodiments of the present disclosure relate to configured grant (CG) enhancements. An apparatus determines whether at least one resource in a predetermined duration is to be used for CG data transmission, the at least one resource following a target resource in time domain. The apparatus transmits, based on a determination result and to a network device, an indication on the target resource, the indication indicating if the at least one resource is used or cancelled. In this way, UE is capable of indicating the usage of CG occasions per period with little increase in signaling overhead. In some cases, a scheduling priority of the UE can be dynamically updated by the network based on such indication.

20 Claims, 4 Drawing Sheets

300

| | | | | CG1_1 | | | | CG1_2 | | | | | CG1_2 | | | | | CG2_1 | | | | | CG2_2 | | | | | CG2_3 |
|---|---|---|---|---|---|---|---|---|---|---|---|---|---|---|---|---|---|---|---|---|---|---|---|---|---|---|---|---|---|
| D | D | D | S | U | D | D | D | S | U | D | D | D | S | U | D | D | D | S | U | D | D | D | S | U | D | D | D | S | U |
| | | | | UCI 1 | | | | UCI 2 | | | | | UCI 3 | | | | | UCI 4 | | | | | UCI 5 | | | | | UCI 6 |

(58) Field of Classification Search
CPC ..... H04W 72/50; H04W 72/51; H04W 72/52;
H04W 72/53; H04W 72/54; H04W
72/541; H04W 72/542; H04W 72/543;
H04W 72/56
See application file for complete search history.

(56) References Cited

OTHER PUBLICATIONS

Huawei et al., "Unified solution for MAC PDU dropping due to intra-UE prioritization," R2-1903370, 3GPP TSG-RAN WG2 Meeting #105bis, Xi'an, China Apr. 8-12, 2019, Apr. 12, 2019.

* cited by examiner

400

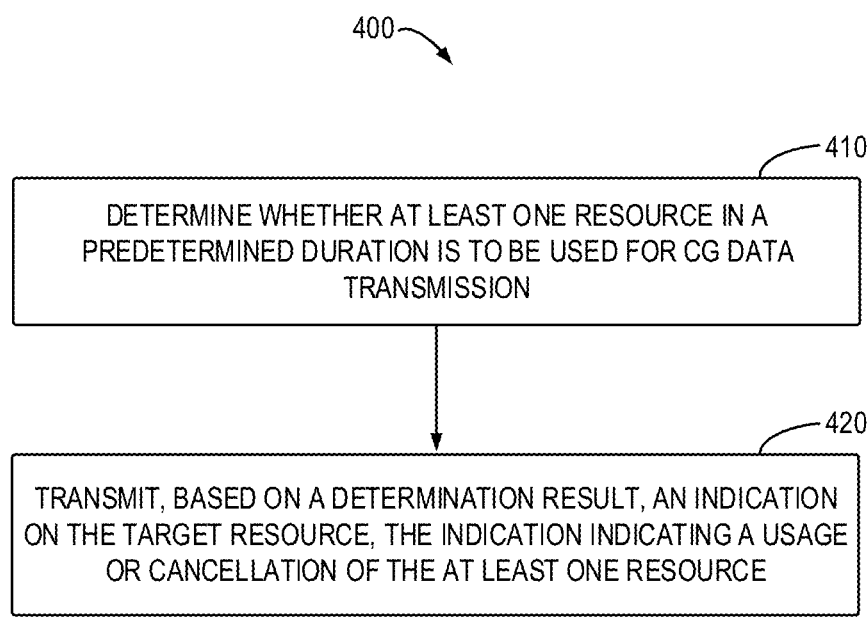

410

DETERMINE WHETHER AT LEAST ONE RESOURCE IN A PREDETERMINED DURATION IS TO BE USED FOR CG DATA TRANSMISSION

420

TRANSMIT, BASED ON A DETERMINATION RESULT, AN INDICATION ON THE TARGET RESOURCE, THE INDICATION INDICATING A USAGE OR CANCELLATION OF THE AT LEAST ONE RESOURCE

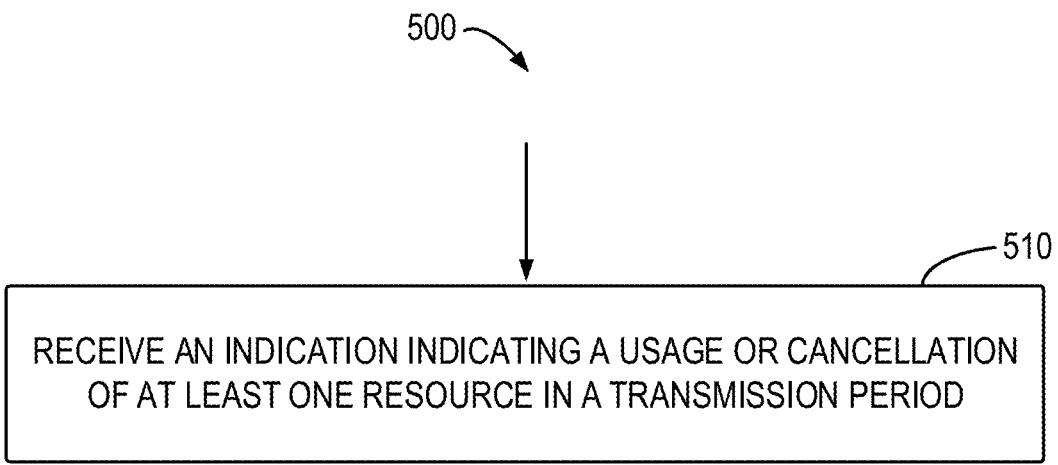

510

RECEIVE AN INDICATION INDICATING A USAGE OR CANCELLATION OF AT LEAST ONE RESOURCE IN A TRANSMISSION PERIOD

CONFIGURED GRANT ENHANCEMENTS

CROSS REFERENCE TO RELATED APPLICATION

This application is a continuation of International Patent Application No. PCT/CN2023/077746 filed on Feb. 22, 2023, which is incorporated herein by reference in its entirety.

FIELD

Various example embodiments of the present disclosure generally relate to the field of telecommunication and in particular, to methods, devices, apparatuses and computer readable storage medium for configured grant (CG) enhancements.

BACKGROUND

Extended Reality (XR) refers to all real-and-virtual combined environments and associated human-machine interactions generated by computer technology and wearables. It includes representative forms, such as, Augmented Reality (AR), Virtual Reality (VR), Mixed Reality (MR), and the areas interpolated among them.

The XR related data, such as video traffic, pose or control information, etc, is characterized by a varying size and a non-integer periodicity. Such data may be scheduled by employing configured grant (CG). For some XR applications, multiple slots in multiple UL CG occasions are required for conveying XR related data, due to the large and variable video frame size. However, due to the variable data size, not all CG occasions may be used in one period. Therefore, the resource utilization for CG transmission needs to be improved.

SUMMARY

In general, example embodiments of the present disclosure provide a solution of CG data transmission.

In a first aspect of the present disclosure, there is provided an apparatus. The apparatus comprises at least one processor; and at least one memory storing instructions that, when executed by the at least one processor, cause the apparatus at least to perform: determining whether at least one resource in a predetermined duration is to be used for configured grant, CG, data transmission, the at least one resource following a target resource in time domain; and transmitting, based on a determination result and to a network device, an indication on the target resource, the indication indicating if the at least one resource is used or cancelled.

In a second aspect of the present disclosure, there is provided an apparatus. The apparatus comprises at least one processor; and at least one memory storing instructions that, when executed by the at least one processor, cause the apparatus at least to perform: receiving, from a terminal device, an indication indicating if at least one resource in a predetermined duration is used or cancelled, the indication being transmitted on a target resource occurring before the at least one resource in time domain, and the at least one resource previously configured for CG data transmission.

In a third aspect of the present disclosure, there is provided a method. The method comprises: determining, at a terminal device, whether at least one resource in a predetermined duration is to be used for CG data transmission, the at least one resource following a target resource in time domain; and transmitting, based on a determination result and to a network device, an indication on the target resource, the indication indicating if the at least one resource is used or cancelled.

In a fourth aspect of the present disclosure, there is provided a method. The method comprises: receiving, at a network device and from a terminal device, an indication indicating if at least one resource in a predetermined duration is used or cancelled, the indication being transmitted on a target resource occurring before the at least one resource in time domain, and the at least one resource previously configured for CG data transmission.

In a fifth aspect of the present disclosure, there is provided a first apparatus. The apparatus comprises: means for determining whether at least one resource in a predetermined duration is to be used for CG data transmission, the at least one resource following a target resource in time domain; and means for transmitting, based on a determination result and to a second apparatus, an indication on the target resource, the indication indicating if the at least one resource is used or cancelled.

In a sixth aspect of the present disclosure, there is provided a second apparatus. The apparatus comprises: means for receiving, from a first apparatus, an indication indicating if at least one resource in a predetermined duration is used or cancelled, the indication being transmitted on a target resource occurring before the at least one resource in time domain, and the at least one resource previously configured for CG data transmission.

In a seventh aspect of the present disclosure, there is provided a computer readable medium. The computer readable medium comprises instructions stored thereon for causing an apparatus to perform the method according to the third aspect or the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 4 illustrates a flowchart of a method implemented at a first apparatus according to some example embodiments of the present disclosure;

FIG. 5 illustrates a flowchart of a method implemented at a second apparatus according to some example embodiments of the present disclosure;

Throughout the drawings, the same or similar reference numerals represent the same or similar element.

DETAILED DESCRIPTION

Figure 1:
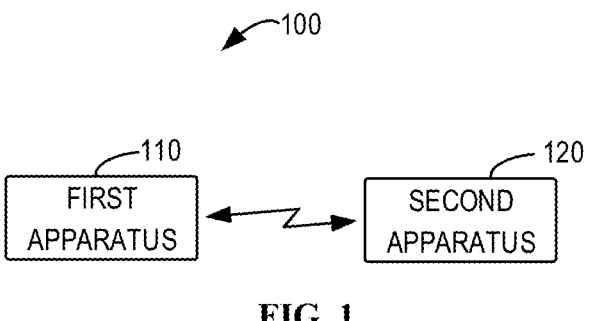
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, "at least one of the following: <a list of two or more elements> and "at least one of <a list of two or more elements> and similar wording, where the list of two or more elements are joined by "and" or "or", means at least any one of the elements, or at least any two or more of the elements, or at least all the elements.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a Next Generation NodeB (NR NB), a Remote Radio Unit (RRU), a radio header (RH), a remote radio head (RRH), Integrated Access and Backhaul (IAB) node, a relay, a low power node such as a femto, a pico, and so forth, depending on the applied terminology and technology. The network device is allowed to be defined as part of a gNB such as for example in CU/DU split in which case the network device is defined to be either a gNB-CU or a gNB-DU.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

As used herein, the term "control device" refers to any entity/function/device/apparatus for control. In some example embodiments, the control device is device used for implementing domain orchestration, network optimization and network management functions and so on.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

The main XR related video traffic characteristics in UL may be summarized as follows:

Non-integer periodicity (e.g., 16.67 ms for 60 fps);

Packet delay budget (PDB) requirement of 30 ms as baseline and 10 ms or 15 ms as optional;

Varying video frame size with mean 20.8 kBytes for 60 fps and 10 Mbit/s following Truncated Gaussian Distribution.

In addition to video traffic in UL, pose/control information may be sent with the following main characteristics:

Periodicity of 4 ms;

Stringent PDB requirement (10 ms);

Frame size of 100 bytes.

As previously mentioned, CG can be used for scheduling UL data transmissions, including but not limited to XR related traffic. For CG based scheduling, parameters may be configured via a RRC message. The actual UL grant may either be configured via RRC for CG type 1, or provided via Physical Downlink Control Channel (PDCCH) (addressed to CS-RNTI) for CG type2. The main characteristics of NR Rel-16 UL CG are as follows:

UL radio resources for sending one transport block with a regular time-periodicity is configured for UE;

The periodicities include 2, 7, n*14 symbols, where the range for n depends on the configured SCS;

Up to 12 CG configurations per bandwidth part (BWP), which may be configured through RRC signaling.

In many cases, the XR related traffic may be transmitted in more than one slot due to the large and variable video size. For certain XR applications, such as AR, there may be different traffics in UL, for example, (i) pose/control information every 4 ms, and/or (ii) video traffic every 16.67 ms for 60 fps. The PDB for pose/control information is equal to 10 ms, for UL video is 30 ms, and 10 ms or 15 ms as optional.

To enhance XR, different types of CG configurations, e.g., one CG occasion per period or multiple CG occasions per period are enabled for transmitting various sizes of XR transmissions. Furthermore, the network, such as, gNB, may expect to know the CG occasion utilization at UE side. In this case, gNB can distribute the unused resources to another UE.

According to the example embodiments of the present disclosure, there is provide a solution of CG transmission. In this solution, UE can provide an indication of used or unused occasions for a CG data transmission without litter signaling overhead. The indication is applicable to various CG configurations, such as, one CG occasion per period, or multiple CG occasions per period.

Based on the indication, the gNB can reuse the released resources for other transmissions. Furthermore, a scheduling priority of UE can be dynamically updated based on whether the UE is to provide the indication and/or the number of unused resources as indicated by the UE. In this way, UE is motivated to provide such indication to the gNB.

FIG. 1 illustrates an example communication environment 100 in which example embodiments of the present disclosure can be implemented. The communication environment 100 may be a communication network supporting various types of CG configuration, such as, a single CG Physical Uplink Shared Channel (PUSCH) occasion per CG transmission period, or multiple CG PUSCH occasions per CG transmission period. The communication network 100 includes a first apparatus 110 and a second apparatus 120.

The first apparatus 110 may be a terminal device, such as, UE. The second apparatus 120 may be a network device serving the first apparatus 110, such as, a gNB. Accordingly, the first apparatus 110 and the second apparatus 120 may communicate with each other. Hereinafter, the first apparatus 110 may also be referred to as the terminal device 110 or UE 110. The second apparatus 120 may also be referred to as the network device 120 or the gNB 120.

In some example embodiments, a link from the second apparatus 120 to the first apparatus 110 is referred to as a downlink (DL), while a link from the first apparatus 110 to the second apparatus 120 is referred to as an uplink (UL). In DL, the second apparatus 120 is a transmitting (TX) device (or a transmitter) and the first apparatus 110 is a receiving (RX) device (or a receiver). In UL, the first apparatus 110 is a TX device (or a transmitter) and the second apparatus 120 is a RX device (or a receiver).

In some example embodiments, the UL transmission from the first apparatus 110 may be scheduled by a CG. Hence, in the context of the example embodiments, such UL transmission may also be referred to as a CG data transmission. The second apparatus 120 may configure the first apparatus 110 with a CG configuration. As previously mentioned, both a configuration of one CG occasion per CG transmission period, and a configuration of multiple CG occasions per CG transmission period are supported in the communication network 100.

The first apparatus 110 may identify whether a slot or an occasion configured for UL transmission is to be cancelled. In some cases, not all the slots or CG occasions may be used by for CG data transmission due to, for example, a variable size of CG data transmission, etc. In this case, the first apparatus 110 may transmit a resource utilization indication to the second apparatus 120 for indicating which one or more CG occasions is used or unused. Such a indication may be transmitted in either a dynamic manner or a fixed manner, which will be discussed in detail below.

It is to be understood that the number of apparatuses and their connections shown in FIG. 1 are only for the purpose of illustration without suggesting any limitation. The communication network 100 may include any suitable number of apparatuses configured to implementing example embodiments of the present disclosure. Although not shown, it would be appreciated that one or more additional apparatuses and connections may be deployed in the communication network 100.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Example embodiments of the present disclosure will be described in detail below with reference to the accompanying drawings.

Figure 2:
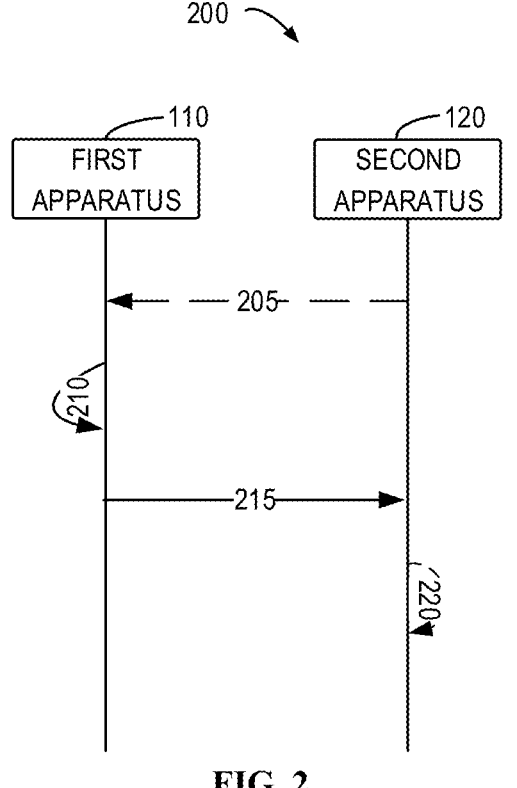
FIG. 2 illustrates a signaling chart for CG data transmission according to some example embodiments of the present disclosure.

Reference is now made to FIG. 2, which illustrates a signaling chart for CG transmission according to some example embodiments of the present disclosure. As shown in FIG. 2, the process 200 involves the first apparatus 110 and the second apparatus 120. For the purpose of discussion, reference is made to FIG. 1 to describe the signaling flow 200.

In the process 200, the data transmission from the first apparatus 110 may be scheduled based on CG. To this end, the second apparatus 120 may configure 205 the first apparatus 110 with a CG configuration. In some example embodiments, the CG configuration may be a single CG PUSCH occasion per CG transmission period. In some other example embodiments, the CG configuration may be multiple CG PUSCH occasions per CG transmission period.

The first apparatus 110 determines 210 whether at least one CG occasion in a predetermined duration is to be used for CG data transmission. In the context of the present disclosure, the term "CG occasion" or "CG PUSCH occasion" refers to a time resource configured for the CG data transmission, which may have various sizes or types, and include the equivalents with different names according to any suitable generation communication protocols and/or communication standards either currently known or to be developed in the future.

In some example embodiments, the first apparatus 110 may determine whether forthcoming CG occasions are needed. By way of example, the first apparatus 110 may evaluate the UL buffer status, and determine whether the at least one forthcoming CG occasion is needed based on the UL buffer status.

In some example embodiments, the first apparatus 110 may decide whether a forthcoming CG occasion is to be used or unused based on whether a data amount in the UL buffer has fallen below a threshold of data amount for the UL buffer. For example, if the data amount in the UL buffer is below the threshold of data amount, the first apparatus 110 may determine that the forthcoming CG occasions is to be unused or cancelled. Otherwise, if the data amount in the UL buffer is not below the threshold of the data amount, then the first apparatus 110 may determine that the CG occasion is to be used for CG data transmission. It should be understood that the certain threshold may also be suitable for indicating a status that the UL buffer becomes empty.

The threshold for the UL buffer is used for evaluating the need of the forthcoming CG occasions for CG data transmission. Additionally, or alternatively, in some example embodiments, before a CG occasion is to be indicated as unused, the threshold for the UL buffer may be determined based on a size of the CG occasion.

In some example embodiments, the first apparatus 110 may decide whether a forthcoming CG occasion is to be used or unused based at least in part on a validity time of the UL buffer data. In particular, the validity time of the UL buffer may be based on at least one of the PDB, PSDB, Packet Data Convergence Protocol (PDCP) discard timer, and so on. If the validity time of the UL buffer data will expire before a forthcoming CG occasion, the first apparatus 110 may determine that the forthcoming CG occasion is no longer needed, and thus can be released/cancelled. Otherwise, if the validity time of the UL buffer data will not expire before the forthcoming CG occasion, the first apparatus 110 may determine that the forthcoming CG occasion needs to be used for transmitting the UL buffer data.

Additionally, or alternatively, in some example embodiments, the first apparatus 110 may decide whether a forthcoming CG occasion is to be used or unused by further taking an importance or priority of a protocol data unit (PDU) to be transmitted into account.

Accordingly, the first apparatus 110 transmits 215 to the second apparatus 120 an indication that indicates if the at least one CG occasion is used or cancelled based on the determination result. The indication may be transmitted on a target resource, and the at least one CG occasions follows the target resource in time domain.

In some example embodiments, the predetermined duration may be at least one CG transmission period, or a sliding window starting from the target resource or one of a first number of resources that immediately follows the target resource in time domain, which will be discussed in detail later.

In some example embodiments, the indication may be carried via uplink control information (UCI). As one of the implementations, one bit in the UCI may be set as the indication, where the bit is set to a first value (e.g., "1") for indicating a next applicable CG occasion to be cancelled or unused, and the bit is set to a second value (e.g., "0") for indicating the next applicable CG occasion to be used.

Additionally, in the example embodiments where multiple CG occasions per CG transmission period is configured, the 1-bit indication in UCI that indicates the next applicable CG occasion, for example, in the next slot or CG occasion within a slot, is unused or cancelled also implicitly indicate all the following occasions in the same period are unused or canceled.

Figures 3A, 3B:
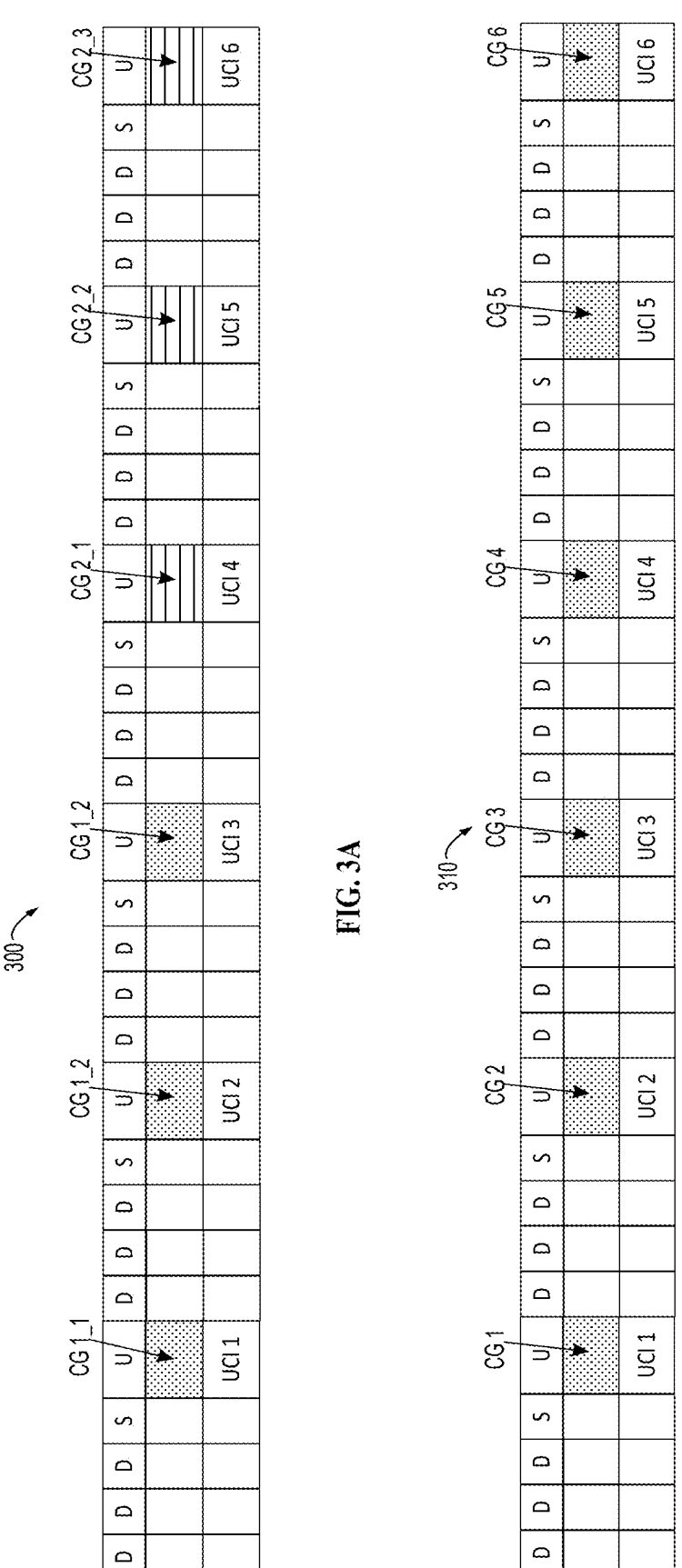
FIG. 3A illustrates a schematic diagram of an example UCI indication according to some example embodiments of the present disclosure.
FIG. 3B illustrates a schematic diagram of another example UCI indication according to some example embodiments of the present disclosure.

FIG. 3A illustrates a schematic diagram of an example UCI indication 300 according to some example embodiments of the present disclosure. In the example of FIG. 3A, the CG configuration has three CG occasions per CG period, i.e., CG 1_1, CG 1_2 and CG 1_3. UCI 1 transmitted in CG 1_1 indicates the resource utilization in the next upcoming occasion. In particular, UCI 1 indicates whether the CG occasions for CG 1_2 are used or unused. All the rest of the CG occasions in that CG period may be implicitly canceled, e.g., CG 1_3 if UCI 1 indication was to cancel the next occasion.

In some example embodiments, if the CG configuration has a single CG occasion per CG period, the 1-bit indication may indicate that the next applicable CG occasion is cancelled. FIG. 3B illustrates a schematic diagram of another example UCI indication 310 according to some example embodiments of the present disclosure. In the example of FIG. 3B, the CG configuration has one CG occasion per CG period, and UCI 1 transmitted in CG 1 indicates the resource utilization in the next upcoming period. In particular, UCI 1 indicates whether the CG occasion for CG 2 used or unused.

In some example embodiments, if the CG configuration has a single CG occasion per CG period, the 1-bit indication may indicate that the next applicable CG occasion is cancelled, and the cancellation of CG occasion will last until the next frame arrival. For example, if UCI 1 indicates that the CG occasion for CG 2 is cancelled, it also implicitly indicates that the CG occasions for CG 3 to CG 6 are cancelled, until the next frame arrival.

In some example embodiments, at least one applicable CG occasion (e.g., in at least one next slot) may be configured by the second apparatus 120. Alternatively, or additionally, the at least one applicable CG occasion may be implicitly determined based on a processing time of the first apparatus 110 or reference information of the processing time provided by the second apparatus 120.

To sum up, if the predetermined duration is the CG period and multiple CG occasions per CG period is configured, the 1-bit indication in UCI can indicate at least one of the following:

a first value of the bit indicating that a CG occasion in the CG period that immediately follows the target resource is to be unused, the first value of the bit indicating that all the CG occasions in the CG period that follow the target resource is to be unused, a second value of the bit indicating the CG occasion in the CG period that immediately follows the target resource is to be used for the CG data transmission, or the second value of the bit indicating that all the CG occasions in the CG period that follow the target resource is to be used for the CG data transmission.

Additionally, if the predetermined duration is a CG period and a single CG occasion per CG period is configured, the target resource occurs before the CG transmission period in time domain, the 1-bit indication in UCI can indicate at least one of the following:

a first value of the bit indicating that the CG occasion in the CG period that immediately follows the target resource is to be unused, a second value of the bit indicating that the CG occasion in the CG period that immediately follows the target resource is to be used for the CG data transmission, or the second value of the bit indicating that all the CG occasions for CG data transmission are to be unused until the CG data transmission occurs.

As another implementation, multiple bits (e.g., N bits) in the UCI may be set as the indication, where each of the N bits indicates whether a respective one of the next N applicable CG occasions is canceled or not. In some example embodiments, each UCI may carry an indication for the next N slots or CG occasions in a sliding manner.

In some example embodiments, once the CG configuration of multiple CG occasions per period is activated, UCI may be transmitted every N CG occasions in a fixed pattern.

In some example embodiments, N unused or used CG occasions may be considered as a sliding window. In other words, the first apparatus 110 may transmit such N-bit indication in every CG occasion for the next N slots. Referring back to FIG. 3A, in this case, N=3, that is, each UCI may include 3 bits for indicating the resource utilization. In particular, UCI 1 indicates used/unused slots for CG 1_2, CG 1_3, CG 2_1. Furthermore, UCI may indicate the slots starting from the next slot or starting from the same slot. In other words, the sliding window may start from the next slot or from the same slot. In the former case, UCI 1 indicates used/unused slots for CG 1_2, CG 1_3, and CG 2_1, and UCI 2 indicates used/unused slots for CG 1_3, CG 2_1, CG 2_2. In the latter case, UCI 1 indicates used/unused slots for CG 1_1, CG 1_2, CG 1_3, and UCI 2 indicates used/unused slots for CG 1_2, CG 1_3, CG 2_1.

To sum up, if the predetermined duration is a CG period, and the indication comprises a first number of bits in UCI, in this case, the first number of bits may indicate respective usage or cancellation of the first number of CG occasions in the CG period that follows the target resource, where a first value of a bit indicates a respective one of the first number of CG occasions is to be unused, and a second value of the bit indicates the respective CG occasions is to be used for the CG data transmission.

In some example embodiments, instead of UCI, demodulation reference signal (DMRS) may be used for conveying the indication. For example, different types of DMRS sequences may be configured to the first apparatus 110. For example, DMRS sequence #1 may be used by the first apparatus 110, if the next CG occasion is to be used for UL data transmission. Otherwise, DMRS sequence #2 may be used by the first apparatus 110, if the next CG occasion is to be cancelled or remains unused. In this way, the indication of the resource utilization is enabled without additional signaling overhead. For another example, different DMRS mapping patterns to resource elements (REs) may be used for indicating if the next slot or CG occasion is used or cancelled.

In the above embodiments, at the second apparatus 120 side, it may be aware of whether the next slot or CG occasion is to be used by the first apparats 110 based on the detected DMRS sequence, or DMRS mapping patterns. It should be noted that the detection performance of DMRS should be good enough to carry just one bit information.

In some example embodiments, the first apparatus 110 may be motivated to provide such indication to the second apparatus 120. For example, the second apparatus 120 may determine 220 whether to increase a scheduling priority of the first apparatus 110 based on whether the first apparatus 110 provides such indication. Additionally, or alternatively, the second apparatus 120 may increase the scheduling priority of the first apparatus 110 according to (e.g., as a function of) the number of unused/canceled CG occasions as indicated.

Additionally, or alternatively, in some example embodiments, the scheduling priority of the first apparatus 110 may be updated dynamically by using a sliding window or a moving average of the number of the unused/canceled CG occasions as indicated.

According to some example embodiments of the present disclosure, there is provided a solution of CG transmission. With the solution, the UE decides whether at least one time slot or CG occasions can be cancelled or not. Accordingly, the UE can provide a resource utilization indication to the gNB with a low signaling overhead. Based on the indication, the gNB can allocate the released resources for other purposes, which improves the resource utilization in the network.

It should be understood that some of the steps in process 200 are optional or can be omitted, and the order of the steps is given for an illustrative purpose. Thus, the embodiments of the present disclosure are not limited in this regard.

The example descriptions on the embodiments of the present disclosure as well as possible standardization impacts and information model in the standards are shown as below. However, it should be understood that the details, values, configurations in the following description are given as example implementations, not limitations to the embodiments of the present disclosure.

FIG. 4 illustrates a flowchart of a method 400 implemented at a first apparatus according to some example embodiments of the present disclosure. For example, the first apparatus may include a terminal device (e.g., UE) or a part of the terminal device. For the purpose of discussion, the method 400 will be described from the perspective of the first apparatus 110 in FIG. 1.

At block 410, the first apparatus 110 determines whether at least one resource in a predetermined duration is to be used for CG data transmission. The at least one resource follows a target resource in time domain.

At block 420, the first apparatus 110 transmits, based on a determination result and to a network device, an indication on the target resource. The indication indicates if the at least one resource is used or cancelled.

In some example embodiments, the predetermined duration may comprise one of the following: at least one CG transmission period, or a sliding window starting the target resource or one of a first number of resources that immediately follows the target resource in time domain.

In some example embodiments, the predetermined duration may be a CG transmission period comprising a plurality of resources for the CG data transmission, the indication comprises one bit in UCI for indicating at least one of the following:

a first value of the bit indicating that a resource in the CG transmission period that immediately follows the target resource is to be unused, the first value of the bit indicating that all the resources in the CG transmission period that follow the target resource is to be unused, a second value of the bit indicating the resource in the CG transmission period that immediately follows the target resource is to be used for the CG data transmission, the second value of the bit indicating that all the resources in the CG transmission period that follow the target resource is to be used for the CG data transmission.

In some example embodiments, the predetermined duration may be a CG transmission period comprising a single resource for the CG data transmission, the target resource occurs before the CG transmission period in time domain, and the indication comprises one bit in UCI for indicating at least one of the following:

a first value of the bit indicating that the resource in the CG transmission period that immediately follows the target resource is to be unused, a second value of the bit indicating that the resource in the CG transmission period that immediately follows the target resource is to be used for the CG data transmission, or the second value of the bit indicating that all the resources for CG data transmission are to be unused until the CG data transmission occurs.

In some example embodiments, the method 400 may further comprise: receiving, from the network device, a configuration of the at least one resource in the predetermined duration.

In some example embodiments, the at least one resource in the predetermined duration may be predetermined based on at least one of a processing time of the apparatus or reference information of the processing time provided by the network device.

In some example embodiments, the predetermined duration may be a CG transmission period comprising a plurality of resources or a single resource for the CG data transmission, the indication comprises a first number of bits in UCI for indicating respective usage or cancellation of the first number of resources in the CG transmission period that follows the target resource, a first value of one of the first number of bits indicates a respective one of the first number of resources is to be unused, and a second value of the bit indicates the respective resource is to be used for the CG data transmission.

In some example embodiments, the indication may be transmitted with a fixed pattern in time domain that comprises a second number of resources periodically occurring in time domain, the target resource is the first one of the second number of resources, and the second number is larger than the first number.

In some example embodiments, the indication may be transmitted within a sliding window in time domain that comprises a second number of resources, and the sliding window starts from the target resource or one of the first number of resources that immediately follows the target resource in time domain.

In some example embodiments, the method 400 may further comprise: determining whether the at least one resource is to be used for CG data transmission based on at least one of the following: a data amount in a buffer of the apparatus, a size of the at least one resource, a validity time of the buffer before the at least one resource, or an importance or priority of the CG data transmission.

In some example embodiments, the indication may comprise a type of a demodulation reference signal, DMRS, sequence or a DMRS mapping pattern.

In some example embodiments, the first apparatus 110 may be preconfigured with a first type of DMRS sequence and a second type of DMRS sequence, and wherein the method 400 may further comprise: based on determining that the at least one resource is to be unused, transmitting the first type of DMRS sequence; or based on determining that the at least one resource is to be used for the CG data transmission, transmitting the second type of DMRS sequence.

In some example embodiments, a scheduling priority of the apparatus may be associated with a number of unused resources indicated in the indication.

FIG. 5 illustrates a flowchart of an example method 500 implemented at a second apparatus 120 in accordance with some example embodiments of the present disclosure. For example, the second apparatus 120 may include a network device (e.g., gNB) or a part of the network device. For the purpose of discussion, the method 500 will be described from the perspective of the second apparatus 120 in FIG. 1.

At 510, the second apparatus 120 receives, from a terminal device, an indication indicating if at least one resource in a predetermined duration is used or cancelled. The indication is transmitted on a target resource occurring before the at least one resource in time domain, and the at least one resource is previously configured for CG data transmission.

In some example embodiments, the predetermined duration may be a CG transmission period comprising a plurality of resources for CG data transmission, the indication may comprise one bit in UCI for indicating at least one of the following:

a first value of the bit indicating that a resource in the CG transmission period that immediately follows the target resource is to be unused, the first value of the bit indicating that all the resources in the CG transmission period that follow the target resource is to be unused, a second value of the bit indicating the resource in the CG transmission period that immediately follows the target resource is to be used for the CG data transmission, or the second value of the bit indicating that all the resources in the CG transmission period that follow the target resource is to be used for the CG data transmission.

In some example embodiments, the predetermined duration may be a CG transmission period comprising a single resource for the CG data transmission, the target resource occurs before the CG transmission period in time domain, and the indication may comprise one bit in UCI for indicating at least one of the following:

a first value of the bit indicating that the resource in the CG transmission period that immediately follows the target resource is to be unused, a second value of the bit indicating that the resource in the CG transmission period that immediately follows the target resource is to be used for the CG data transmission, or the second value of the bit indicating that all the resources for CG data transmission that immediately follows the target resource are to be unused until the CG data transmission occurs.

In some example embodiments, the method 500 may further comprise: transmitting, to the terminal device, a configuration of the at least one resource in the predetermined duration.

In some example embodiments, the at least one resource in the predetermined duration may be predetermined based on at least one of a processing time of the apparatus or reference information of the processing time provided by the network device.

In some example embodiments, the predetermined duration may be a CG transmission period comprising a plurality of resources or a single resource for the CG data transmission, the indication comprises a first number of bits in UCI for indicating respective usage or cancellation of the first number of resources in the CG transmission period that follows the target resource, a first value of one of the first number of bits indicates a respective one of the first number of resources is to be unused, and a second value of the bit indicates the respective resource is to be used for the CG data transmission.

In some example embodiments, the indication may be transmitted with a fixed pattern in time domain that comprises a second number of resources periodically occurring in time domain, the target resource is the first one of the second number of resources, and the second number is larger than the first number.

In some example embodiments, the indication may be transmitted within a sliding window in time domain that comprises a second number of resources, and the sliding window starts from the target resource or one of the first number of resources that immediately follows the target resource in time domain.

In some example embodiments, the indication comprises a type of a demodulation reference signal, DMRS, sequence or a DMRS mapping pattern.

In some example embodiments, the terminal device may be preconfigured with a first type of DMRS sequence and a second type of DMRS sequence, and wherein the method 500 may further comprise: based on determining that the indication comprises the first type of DMRS, determining that the at least one resource is to be unused; or based on determining that the indication comprises the second type of DMRS, determining that the at least one resource is to be used for the CG data transmission.

In some example embodiments, the method 500 may further comprise: updating a scheduling priority of the terminal device based on indicated usage or cancellation of the at least one resource.

In some example embodiments, the scheduling priority of the terminal device may be associated with a number of unused resources indicated in the indication.

In some example embodiments, the scheduling priority of the terminal device may be updated based on a sliding window or an average of numbers of unused resources indicated in a plurality of indications from the terminal device.

In some example embodiments, a first apparatus capable of performing any of the method 400 (for example, the first apparatus 110 in FIG. 1) may comprise means for performing the respective operations of the method 400. The means may be implemented in any suitable form. For example, the means may be implemented in a circuitry or software module. The first apparatus may be implemented as or included in the first apparatus 110 in FIG. 1.

In some example embodiments, the first apparatus comprises: means for determining whether at least one resource in a predetermined duration is to be used for CG data transmission, the at least one resource following a target resource in time domain; and means for transmitting, based on a determination result and to a second apparatus, an indication on the target resource, the indication indicating if the at least one resource is used or cancelled.

In some example embodiments, the predetermined duration comprises one of the following: at least one CG transmission period, or a sliding window starting the target resource or one of a first number of resources that immediately follows the target resource in time domain.

In some example embodiments, the predetermined duration is a CG transmission period comprising a plurality of resources for the CG data transmission, the indication comprises one bit in uplink control information, UCI for indicating at least one of the following: a first value of the bit indicating that a resource in the CG transmission period that immediately follows the target resource is to be unused, the first value of the bit indicating that all the resources in the CG transmission period that follow the target resource is to be unused, a second value of the bit indicating the resource in the CG transmission period that immediately follows the target resource is to be used for the CG data transmission, or the second value of the bit indicating that all the resources in the CG transmission period that follow the target resource is to be used for the CG data transmission.

In some example embodiments, the predetermined duration is a CG transmission period comprising a single resource for the CG data transmission, the target resource occurs before the CG transmission period in time domain, and the indication comprises one bit in UCI for indicating at least one of the following: a first value of the bit indicating that the resource in the CG transmission period that immediately follows the target resource is to be unused, a second value of the bit indicating that the resource in the CG transmission period that immediately follows the target resource is to be used for the CG data transmission, or the second value of the bit indicating that all the resources for CG data transmission are to be unused until the CG data transmission occurs.

In some example embodiments, the first apparatus further comprises: means for receiving, from the second apparatus, a configuration of the at least one resource in the predetermined duration.

In some example embodiments, the at least one resource in the predetermined duration is predetermined based on at least one of a processing time of the first apparatus or reference information of the processing time provided by the second apparatus.

In some example embodiments, the predetermined duration is a CG transmission period comprising a plurality of resources or a single resource for the CG data transmission, the indication comprises a first number of bits in UCI for indicating respective usage or cancellation of the first number of resources in the CG transmission period that follows the target resource, a first value of one of the first number of bits indicates a respective one of the first number of resources is to be unused, and a second value of the bit indicates the respective resource is to be used for the CG data transmission.

In some example embodiments, the indication is transmitted with a fixed pattern in time domain that comprises a second number of resources periodically occurring in time domain, the target resource is the first one of the second number of resources, and the second number is larger than the first number.

In some example embodiments, the indication is transmitted within a sliding window in time domain that comprises a second number of resources, and the sliding window starts from the target resource or one of the first number of resources that immediately follows the target resource in time domain.

In some example embodiments, the first apparatus further comprises: means for determining whether the at least one resource is to be used for CG data transmission based on at least one of the following: a data amount in a buffer of the first apparatus, a size of the at least one resource, a validity time of the buffer before the at least one resource, or an importance or priority of the CG data transmission.

In some example embodiments, the indication comprises a type of a demodulation reference signal, DMRS, sequence or a DMRS mapping pattern.

In some example embodiments, the first apparatus is preconfigured with a first type of DMRS sequence and a second type of DMRS sequence, and wherein the first apparatus further comprises: means for based on determining that the at least one resource is to be unused, transmitting the first type of DMRS sequence; or means for based on determining that the at least one resource is to be used for the CG data transmission, transmitting the second type of DMRS sequence.

In some example embodiments, a scheduling priority of the first apparatus is associated with a number of unused resources indicated in the indication.

In some example embodiments, a second apparatus capable of performing any of the method 500 (for example, the second apparatus 120 in FIG. 1) may comprise means for performing the respective operations of the method 500. The means may be implemented in any suitable form. For example, the means may be implemented in a circuitry or software module. The second apparatus may be implemented as or included in the second apparatus 120 in FIG. 1.

In some example embodiments, the second apparatus comprises: means for receiving, from a first apparatus, an indication indicating if at least one resource in a predetermined duration is used or cancelled, the indication being transmitted on a target resource occurring before the at least one resource in time domain, and the at least one resource previously configured for CG data transmission.

In some example embodiments, the predetermined duration is a CG transmission period comprising a plurality of resources for CG data transmission, the indication comprises one bit in UCI for indicating at least one of the following: a first value of the bit indicating that a resource in the CG transmission period that immediately follows the target resource is to be unused, the first value of the bit indicating that all the resources in the CG transmission period that follow the target resource is to be unused, a second value of the bit indicating the resource in the CG transmission period that immediately follows the target resource is to be used for the CG data transmission, or the second value of the bit indicating that all the resources in the CG transmission period that follow the target resource is to be used for the CG data transmission.

In some example embodiments, the predetermined duration is a CG transmission period comprising a single resource for the CG data transmission, the target resource occurs before the CG transmission period in time domain, and the indication comprises one bit in UCI for indicating at least one of the following: a first value of the bit indicating that the resource in the CG transmission period that immediately follows the target resource is to be unused, a second value of the bit indicating that the resource in the CG transmission period that immediately follows the target resource is to be used for the CG data transmission, or the second value of the bit indicating that all the resources for CG data transmission that immediately follows the target resource are to be unused until the CG data transmission occurs.

In some example embodiments, the second apparatus further comprises: means for transmitting, to the first apparatus, a configuration of the at least one resource in the predetermined duration.

In some example embodiments, the at least one resource in the predetermined duration is predetermined based on at least one of a processing time of the first apparatus or reference information of the processing time provided by the second apparatus.

In some example embodiments, the predetermined duration is a CG transmission period comprising a plurality of resources or a single resource for the CG data transmission, the indication comprises a first number of bits in UCI for indicating respective usage or cancellation of the first number of resources in the CG transmission period that follows the target resource, a first value of one of the first number of bits indicates a respective one of the first number of resources is to be unused, and a second value of the bit indicates the respective resource is to be used for the CG data transmission.

In some example embodiments, the indication is transmitted with a fixed pattern in time domain that comprises a second number of resources periodically occurring in time domain, the target resource is the first one of the second number of resources, and the second number is larger than the first number.

In some example embodiments, the indication is transmitted within a sliding window in time domain that comprises a second number of resources, and the sliding window starts from the target resource or one of the first number of resources that immediately follows the target resource in time domain.

In some example embodiments, the indication comprises a type of a demodulation reference signal, DMRS, sequence or a DMRS mapping pattern.

In some example embodiments, the first apparatus is preconfigured with a first type of DMRS sequence and a second type of DMRS sequence, and wherein the second apparatus further comprises: means for based on determining that the indication comprises the first type of DMRS, determining that the at least one resource is to be unused; or means for based on determining that the indication comprises the second type of DMRS, determining that the at least one resource is to be used for the CG data transmission.

In some example embodiments, the second apparatus further comprises: means for updating a scheduling priority of the first apparatus based on indicated usage or cancellation of the at least one resource.

In some example embodiments, the scheduling priority of the first apparatus is associated with a number of unused resources indicated in the indication.

In some example embodiments, the scheduling priority of the first apparatus is updated based on a sliding window or an average of numbers of unused resources indicated in a plurality of indications from the first apparatus.

Figure 6:
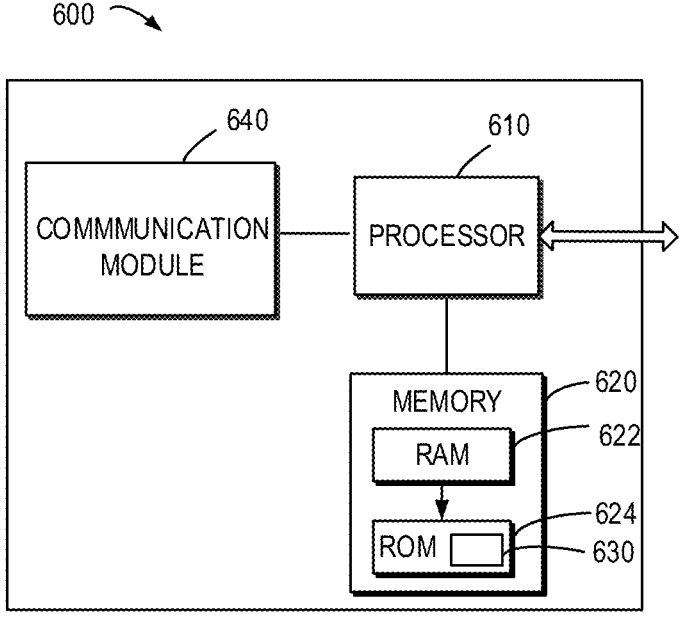
FIG. 6 illustrates a simplified block diagram of a device that is suitable for implementing example embodiments of the present disclosure.

FIG. 6 is a simplified block diagram of a device 600 that is suitable for implementing example embodiments of the present disclosure. The device 600 may be provided to implement a communication device, for example, the first apparatus 110, or the second apparatus 120 as shown in FIG. 1. As shown, the device 600 includes one or more processors 610, one or more memories 620 that may couple to the processor 610, and one or more communication modules 640 that may couple to the processor 610.

The communication module 640 may be for bidirectional communications. The communication module 640 may have one or more communication interfaces to facilitate communication with one or more other modules or devices. The communication interfaces may represent any interface that is necessary for communication with other network elements. In some example embodiments, the communication module 640 may include at least one transceiver. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The instructions of the program 630 may include instructions for performing operations/acts of some example embodiments of the present disclosure. The program 630 may be stored in the memory, e.g., the ROM 624. The processor 610 may perform any suitable actions and processing by loading the program 630 into the RAM 622.

The example embodiments of the present disclosure may be implemented by means of the program 630 so that the device 600 may perform any process of the disclosure as discussed with reference to FIG. 2 to FIG. 5. The example embodiments of the present disclosure may also be implemented by hardware or by a combination of software and hardware.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 7:
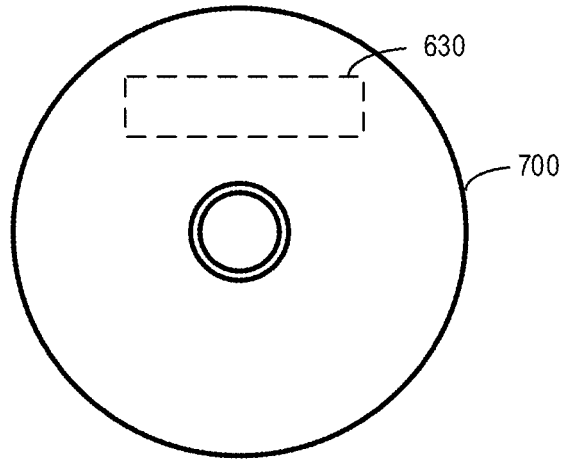
FIG. 7 illustrates a block diagram of an example computer readable medium in accordance with some example embodiments of the present disclosure.

FIG. 7 shows an example of the computer readable medium 700 which may be in form of CD, DVD or other optical storage disk. The computer readable medium 700 has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus, comprising:
at least one processor; and
at least one memory storing instructions that, when executed by the at least one processor, cause the apparatus at least to:
determine whether at least one resource in a predetermined duration is to be used for configured grant (CG) data transmission, the at least one resource following a target resource in time domain, wherein the predetermined duration comprises a sliding window starting from the target resource or one of a first number of resources that immediately follows the target resource in time domain, wherein the sliding window or a moving average of a number of unused or cancelled CG occasions is configured to dynamically update resources scheduling of the apparatus; and
transmit, based on a determination result and to a network device, an indication on the target resource, the indication indicating if the at least one resource is used or cancelled.

2. The apparatus of claim 1, wherein the predetermined duration further comprises the following:
at least one CG data transmission period.

3. The apparatus of claim 2, wherein the predetermined duration is a CG data transmission period comprising a plurality of resources or a single resource for the CG data transmission, the indication comprises a first number of bits in UCI for indicating respective usage or cancellation of the first number of resources in the CG data transmission period that follows the target resource, a first value of one of the first number of bits indicates a respective one of the first number of resources is to be unused, and a second value of the bit indicates the respective resource is to be used for the CG data transmission.

4. The apparatus of claim 3, wherein the indication is transmitted with a fixed pattern in time domain that comprises a second number of resources periodically occurring in time domain, the target resource is the first one of the second number of resources, and the second number is larger than the first number.

5. The apparatus of claim 3, wherein the indication is transmitted within the sliding window in time domain that comprises a second number of resources, and the sliding window starts from the target resource or one of the first number of resources that immediately follows the target resource in time domain.

6. The apparatus of claim 1, wherein the predetermined duration is a CG data transmission period comprising a plurality of resources for the CG data transmission, the indication comprises one bit in uplink control information (UCI) for indicating at least one of the following:
a first value of the bit indicating that a resource in the CG data transmission period that immediately follows the target resource is to be unused,
the first value of the bit indicating that all the resources in the CG data transmission period that follow the target resource is to be unused,
a second value of the bit indicating the resource in the CG data transmission period that immediately follows the target resource is to be used for the CG data transmission, or

21

22 the second value of the bit indicating that all the resources in the CG data transmission period that follow the target resource is to be used for the CG data transmission.

7. The apparatus of claim 1, wherein the predetermined duration is a CG data transmission period comprising a single resource for the CG data transmission, the target resource occurs before the CG transmission data period in time domain, and the indication comprises one bit in UCI for indicating at least one of the following:

a first value of the bit indicating that the resource in the CG data transmission period that immediately follows the target resource is to be unused, a second value of the bit indicating that the resource in the CG data transmission period that immediately follows the target resource is to be used for the CG data transmission, or the second value of the bit indicating that all the resources for CG data transmission are to be unused until the CG data transmission occurs.

8. The apparatus of claim 1, wherein the apparatus is further caused to:

receive, from the network device, a configuration of the at least one resource in the predetermined duration.

9. The apparatus of claim 1, wherein the at least one resource in the predetermined duration is predetermined based on at least one of a processing time of the apparatus or reference information of the processing time provided by the network device.

10. The apparatus of claim 1, wherein the apparatus is further caused to:

determine whether the at least one resource is to be used for CG data transmission based on at least one of the following: a data amount in a buffer of the apparatus, a size of the at least one resource, a validity time of the buffer before the at least one resource, or an importance or priority of the CG data transmission.

11. The apparatus of claim 1, wherein the indication comprises a type of a demodulation reference signal, DMRS, sequence or a DMRS mapping pattern.

12. The apparatus of claim 11, wherein the apparatus is preconfigured with a first type of DMRS sequence and a second type of DMRS sequence, and wherein the apparatus is further caused to:

based on determining that the at least one resource is to be unused, transmitting the first type of DMRS sequence; or based on determining that the at least one resource is to be used for the CG data transmission, transmitting the second type of DMRS sequence.

13. The apparatus of claim 1, wherein the scheduling priority of the apparatus is associated with a number of unused resources indicated in the indication.

14. An apparatus, comprising:

at least one processor; and at least one memory storing instructions that, when executed by the at least one processor, cause the apparatus at least to:

receive, from a terminal device, an indication indicating if at least one resource in a predetermined duration is used or cancelled, the indication being transmitted on a target resource occurring before the at least one resource in time domain, and the at least one resource previously configured for CG data transmission, wherein the predetermined duration comprises a sliding window starting from the target resource or one of a first number of resources that immediately follows the target resource in time domain, wherein the sliding window or a moving average of a number of unused or cancelled CG occasions is configured to dynamically update resources scheduling of the terminal device.

15. The apparatus of claim 14, wherein the predetermined duration further comprises the following:

at least one CG data transmission period.

16. The apparatus of claim 14, wherein the predetermined duration is a CG data transmission period comprising a plurality of resources for CG data transmission, the indication comprises one bit in uplink control information (UCI) for indicating at least one of the following:

a first value of the bit indicating that a resource in the CG data transmission period that immediately follows the target resource is to be unused, the first value of the bit indicating that all the resources in the CG data transmission period that follow the target resource is to be unused, a second value of the bit indicating the resource in the CG data transmission period that immediately follows the target resource is to be used for the CG data transmission, or the second value of the bit indicating that all the resources in the CG data transmission period that follow the target resource is to be used for the CG data transmission.

17. The apparatus of claim 14, wherein the predetermined duration is a CG data transmission period comprising a single resource for the CG data transmission, the target resource occurs before the CG data transmission period in time domain, and the indication comprises one bit in UCI for indicating at least one of the following:

a first value of the bit indicating that the resource in the CG data transmission period that immediately follows the target resource is to be unused, a second value of the bit indicating that the resource in the CG data transmission period that immediately follows the target resource is to be used for the CG data transmission, or the second value of the bit indicating that all the resources for CG data transmission that immediately follows the target resource are to be unused until the CG data transmission occurs.

18. The apparatus of claim 14, wherein the apparatus is further caused to:

transmit, to the terminal device, a configuration of the at least one resource in the predetermined duration.

19. The apparatus of claim 14, wherein the indication comprises a type of a demodulation reference signal (DMRS) sequence or a DMRS mapping pattern;

wherein the terminal device is preconfigured with a first type of DMRS sequence and a second type of DMRS sequence, and wherein the apparatus is further caused to:

based on determining that the indication comprises the first type of DMRS, determining that the at least one resource is to be unused; or based on determining that the indication comprises the second type of DMRS, determining that the at least one resource is to be used for the CG data transmission.

20. A method comprising:

determining, at a terminal device, whether at least one resource in a predetermined duration is to be used for configured grant (CG) data transmission, the at least one resource following a target resource in time domain, wherein the predetermined duration comprises a sliding window starting from the target resource or one of a first number of resources that immediately follows the target resource in time domain, wherein the sliding window or a moving average of a number of unused or cancelled CG occasions is configured to dynamically update resources scheduling of the terminal device; and transmitting, based on a determination result and to a network device, an indication on the target resource, the indication indicating if the at least one resource is used or cancelled.

\* \* \* \* \*